UNITED STATES PATENT OFFICE.

MICHAEL J. CALLAHAN, OF PITTSFIELD, MASSACHUSETTS, ASSIGNOR TO GENERAL ELECTRIC COMPANY, A CORPORATION OF NEW YORK.

RESINOUS COMPOSITION.

1,108,331.   Specification of Letters Patent.   Patented Aug. 25, 1914.

No Drawing.   Application filed February 8, 1913.  Serial No. 747,115.

*To all whom it may concern:*

Be it known that I, MICHAEL J. CALLAHAN, a citizen of the United States, residing at Pittsfield, county of Berkshire, State of Massachusetts, have invented certain new and useful Improvements in Resinous Compositions, of which the following is a specification.

The present invention relates to the synthetic resinous condensation products obtainable by the interaction of a polybasic acid such as phthalic anhydrid with glycerol or other polyhydric alcohol; and its object is to increase the availability of this resin in a fused state for impregnating and other purposes.

As described in my former application, Serial Number 696,704, filed May 11, 1912, glycerol or other polyacid alcohol and phthalic anhydrid react at an elevated temperature to form a clear, brittle, fusible compound which is soluble in acetone and which upon continued heating is transformed to an infusible, insoluble state. This transformation, although hastened by an increase of temperature, proceeds even at the melting point of the product. This fact renders the impregnation of cellular or fibrous bodies with the fused resin difficult, as the penetration is retarded and when a large quantity of resin is melted considerable material is apt to be lost by its hardening in the tank.

I have discovered that the hardening of the fused resin may be prevented by the addition to the fused mass of a hydrocarbon of the cyclic or aromatic series, containing condensed nuclei, for example, naphthalene, anthracene, phenanthrene, or other polymers, or their substitution products.

As described in my former application, the resin is prepared by slowly heating to about 185° C., a mixture consisting by weight of about two parts of phthalic anhydrid and one part of glycerol, until distillation ceases, and the heating being then continued at about 210° C. until small samples when cold are hard and brittle without stickiness. Heating of the mass is then discontinued. The resulting resin is fusible at about 120° C. and soluble in acetone.

In the preferred form of my invention about 13 to 18 per cent. by weight of naphthalene is dissolved in the melted resin. The fusing point of the resin is lowered by the dissolved naphthalene to about 90 to 100° C. It follows from this that at higher temperatures the naphthalene increases the fluidity of the melt for any given temperature. A lesser proportion of naphthalene may be used, but it will have a correspondingly less effect on the melting point of the resin. The naphthalene is kept in solution by maintaining the material heated in a closed tank, preferably by means of steam heat. In this manner the melt is maintained under the vapor pressure of the naphthalene which sublimes from the mass but is melted on the hot walls of the tank and drops back into the fused mass.

For the purposes of impregnation it is better that the fused material be kept under slight pressure, say air pressure of 10 to 20 pounds per square inch, in order to prevent the sublimed naphthalene from entering pipes and condensing. When a charge is to be used for impregnating porous articles of considerable mass, such as electrical coils wound with fabrics, or cellular material such as wood, or thick paper, an air pressure of 80 to 90 pounds to the square inch is preferably exerted upon the melted resin to force the same into the interstices of the articles to be impregnated. The length of time necessary for complete penetration of the resin into the pores of the article to be impregnated may vary from a few minutes to several hours and can be easily determined by trial.

As described in my former application, the fusible soluble resin may be converted into an infusible, insoluble state by heating to a temperature from about 85 to 135° C. When it is desired to harden the resin thus introduced into electrical coils or the like, the coils are baked after impregnation, at atmospheric pressure, for a sufficient length of time to drive out the naphthalene and also to complete the above-described preliminary hardening of the resin. The baking temperature may vary from 135 to 150° C., the temperature being increased to the higher limit toward the end of the baking operation when the naphthalene has been largely removed and the resin partially hardened. The length of time necessary to complete this first stage of the hardening of the resin and removal of the solvent will depend upon the size and shape of the impregnated articles, but, in general, it may be said that several hours are required. In some cases the pressure may be less than atmospheric, with advantage. A vacuum may be used to draw out trapped air, especially before the resin is introduced. The naphthalene, of course, may be recovered and used over again.

As described in my application Serial No. 747,114 filed concurrently herewith, I have found that a second stage of hardening takes place when the temperature is raised to about 190 to 250° C. or even higher for several hours, or when the heating is continued for several weeks at 135 to 150° C. Under these conditions the resin becomes harder than vulcanized rubber, very much stronger and also more chemically inert. Its insulating value is improved in the case of impregnated coils, the preferred temperature range for this second stage of reaction is about 190 to 200° C., and this heat is continued for several hours in an open oven.

Although I have described my invention with particular reference to the use of naphthalene, it will be understood that substitution products such as monochlor-naphthalene and tetrachlor-naphthalene may also be used, but their use introduces difficulties due to their high boiling points. Anthracene and its substitution products may also be used.

What I claim as new and desire to secure by Letters Patent of the United States, is:—

1. The process of preventing the hardening of a fusible resin of a polyhydric alcohol and phthalic anhydrid which consists in maintaining dissolved therein a hydrocarbon of the aromatic series with condensed nuclei.

2. The process of maintaining a resinous compound saponifiable to yield polyhydric alcohol and a phthalate in a fluid state at an elevated temperature which consists in dissolving therein a hydrocarbon of the aromatic series with condensed nuclei and maintaining said hydrocarbon in solution by compensating pressure.

3. The process of preventing the conversion of a fusible, soluble resin of glycerol and phthalic anhydrid to the infusible, insoluble state at an elevated temperature which consists in maintaining naphthalene in contact therewith.

4. A composition of matter comprising a fusible resinous condensation product saponifiable by alkali to form a phthalate and a polyhydric alcohol and a heavy hydrocarbon of the aromatic series dissolved therein.

5. A composition of matter comprising naphthalene and a condensation product saponifiable by alkali to yield glycerol and a phthalate of the alkali.

6. A composition of matter comprising a fusible resinous condensation product saponifiable by alkali to form glycerol and a phthalate and about 13-18 per cent. of naphthalene.

7. An impregnating composition comprising a solution of hydrocarbon of the cyclic series containing condensed nuclei and a fusible resinous condensation product of a polyhydric alcohol and a polybasic acid, said resinous product being saponifiable and convertible when out of contact with the hydrocarbon to an infusible, insoluble state.

In witness whereof, I have hereunto set my hand this fifth day of February, 1913.

MICHAEL J. CALLAHAN.

Witnesses:
ROBERT F. CHAMBERS,
JAMES N. LAWRENCE.